United States Patent
Liu et al.

(10) Patent No.: US 11,236,926 B2
(45) Date of Patent: Feb. 1, 2022

(54) AIR CONDITIONING HEAT PUMP SYSTEM USING EJECTOR, AIR CONDITIONER, AND AIR CONDITIONER CONTROL METHOD

(71) Applicant: Qingdao Hisense Hitachi Air-Conditioning Systems Co., Ltd., Shandong (CN)

(72) Inventors: Min Liu, Shandong (CN); Wenqiang Zhang, Shandong (CN); Hu Li, Shandong (CN); Minglong Du, Shandong (CN)

(73) Assignee: Qingdao Hisense Hitachi Air-Conditioning Systems Co., Ltd., Shandong (CN)

( * ) Notice: Subject to any disclaimer, the term of this patent is extended or adjusted under 35 U.S.C. 154(b) by 394 days.

(21) Appl. No.: 16/351,177

(22) Filed: Mar. 12, 2019

(65) Prior Publication Data

US 2019/0242610 A1    Aug. 8, 2019

Related U.S. Application Data

(63) Continuation of application No. PCT/CN2017/110516, filed on Nov. 10, 2017.

(30) Foreign Application Priority Data

Sep. 12, 2016    (CN) .......................... 201610818928.X

(51) Int. Cl.
*F24F 11/84*    (2018.01)
*B60H 1/00*    (2006.01)
(Continued)

(52) U.S. Cl.
CPC .......... *F24F 11/84* (2018.01); *B60H 1/00885* (2013.01); *B60H 1/00899* (2013.01);
(Continued)

(58) Field of Classification Search
CPC ...... F24F 11/84; F24F 5/00; F24F 1/01; F24F 5/001; F24F 5/0046; F25B 49/02;
(Continued)

(56) References Cited

U.S. PATENT DOCUMENTS

| | | | | |
|---|---|---|---|---|
| 6,477,857 B2 * | 11/2002 | Takeuchi | ................ | F25B 9/008 62/191 |
| 7,254,961 B2 * | 8/2007 | Oshitani | ................ | B60H 1/323 62/500 |

(Continued)

FOREIGN PATENT DOCUMENTS

| | | |
|---|---|---|
| CN | 1432775 A | 7/2003 |
| CN | 102734886 A | 10/2012 |

(Continued)

OTHER PUBLICATIONS

Extended European Search Report dated Dec. 4, 2020 for EP Application No. 17848199.0 (6 pp.).

(Continued)

*Primary Examiner* — Ana M Vazquez
(74) *Attorney, Agent, or Firm* — Crowell & Moring LLP

(57) ABSTRACT

An air conditioning heat pump system using an ejector may include a compression assembly, an outdoor heat exchanger, an indoor heat exchanger, an ejector, and a first to third electromagnetic valve and a controller. A first end of the compression assembly may be connected with the one end of the outdoor heat exchanger, a second end may be connected with one end of the indoor heat exchanger, a third end may connected with outlet end of the ejector, and a fourth end may be connected with another end of the outdoor heat exchanger. One end of the outdoor heat exchanger may also be connected with a jet inlet of the ejector through the first electromagnetic valve, and another end may also be con- (Continued)

nected with the jet inlet of the ejector through the second electromagnetic valve and the third electromagnetic valve.

18 Claims, 5 Drawing Sheets

(51) Int. Cl.
| | | |
|---|---|---|
| *F24F 5/00* | (2006.01) | |
| *F25B 19/02* | (2006.01) | |
| *B60H 1/32* | (2006.01) | |
| *F25B 49/02* | (2006.01) | |
| *F16K 37/00* | (2006.01) | |
| *F16K 49/00* | (2006.01) | |
| *F24F 1/01* | (2011.01) | |

(52) U.S. Cl.
CPC ....... *B60H 1/3213* (2013.01); *F16K 37/0025* (2013.01); *F16K 49/005* (2013.01); *F24F 1/01* (2013.01); *F24F 5/00* (2013.01); *F25B 19/02* (2013.01); *F25B 49/02* (2013.01); *B60H 2001/3298* (2013.01); *F25B 2341/0012* (2013.01); *F25B 2400/0407* (2013.01)

(58) Field of Classification Search
CPC .............. F25B 19/02; F25B 2341/0012; F25B 2400/047; F25B 13/00; F25B 41/22; F25B 41/31; B60H 1/00899; B60H 1/3213; B60H 1/00885; B60H 2001/3298
See application file for complete search history.

(56) References Cited

U.S. PATENT DOCUMENTS

| | | | |
|---|---|---|---|
| 2003/0131611 A1 | 7/2003 | Oshitani et al. | |
| 2012/0180510 A1* | 7/2012 | Okazaki | F25B 13/00 |
| | | | 62/218 |
| 2017/0211853 A1* | 7/2017 | Feng | F25B 41/31 |

FOREIGN PATENT DOCUMENTS

| | | |
|---|---|---|
| CN | 103743020 A | 4/2014 |
| CN | 103900174 A | 7/2014 |
| CN | 104197444 A | 12/2014 |
| CN | 104501449 A | 4/2015 |
| CN | 204665742 U | 9/2015 |
| CN | 105020936 A | 11/2015 |
| CN | 105333545 A | 2/2016 |
| CN | 205227906 U | 5/2016 |
| CN | 105737459 A | 7/2016 |
| JP | 2007-003166 A | 1/2007 |
| JP | 2015-158329 A | 9/2015 |
| KR | 10-2012-0035174 A | 4/2012 |
| KR | 10-1212686 | 12/2012 |
| KR | 10-2014-0141771 A | 12/2020 |

OTHER PUBLICATIONS

First Office Action for China Patent Application No. 201610818928.X dated Aug. 6, 2018 (English and Chinese languages) (9 pp.).
International Search Report and Written Opinion dated Feb. 1, 2018 for PCT/CN2017/110516 (English and Chinese languages) (11 pp.).

* cited by examiner

AIR CONDITIONING HEAT PUMP SYSTEM USING EJECTOR, AIR CONDITIONER, AND AIR CONDITIONER CONTROL METHOD

RELATED APPLICATION

This application is a Bypass Continuation Application of PCT/CN2017/110516, filed Nov. 10, 2017, which claims priority to Chinese Patent Application No. 201610818928.X, filed on Sep. 12, 2016, and titled "AIR CONDITIONING HEAT PUMP SYSTEM USING AN EJECTOR." Each application in the preceding sentence is hereby incorporated by reference in its entirety.

TECHNICAL FIELD

The present disclosure relates to the field of air conditioning, and more particularly, to an air conditioning heat pump system using an ejector, an air conditioner, and an air conditioner control method.

BACKGROUND

Air conditioning, with its superior cooling and heating functions, has become an important means for cooling down and warming up the room in people's daily life. Air conditioning mainly uses air conditioning heat pump systems to extract cold and heat from the environment to cool down or warm up the indoor environment. The air-conditioning heat pump system mainly extracts the cold and heat from the environment through the work of the compressor. In this process, the compressor consumes electric energy to compress a low-temperature and low-pressure refrigerant into a high-temperature and high-pressure refrigerant. And then, in the cooling mode, the high-temperature and high-pressure refrigerant is condensed and cooled by an outdoor heat exchanger, and is then input to the indoor heat exchanger for evaporation and heat exchange to cool down the room. Alternatively, in the heating mode, the high-temperature and high-pressure refrigerant is input to the indoor heat exchanger for condensation and heat dissipation, thereby transferring heat to the indoor environment.

SUMMARY

In a first aspect, some embodiments of the present disclosure provide an air conditioning heat pump system using an ejector, comprising a compression assembly, an outdoor heat exchanger, an indoor heat exchanger, an ejector, a first to third electromagnetic valve s and a controller, wherein, a first end of the compression assembly is connected with one end of the outdoor heat exchanger, a second end of the compression assembly is connected with another one end of the indoor heat exchanger, a third end of the compression assembly is connected with an outlet end of the ejector, a fourth end of the compression assembly is connected with another end of the outdoor heat exchanger;

the one end of the outdoor heat exchanger is also connected with a jet inlet of the ejector through the first electromagnetic valve, the another end of the outdoor exchanger is also connected with an injection inlet of the ejector through the second electromagnetic valve and the third electromagnetic valve;

another end of the indoor heat exchanger is connected with an injection inlet of the ejector through the third electromagnetic valve, and connected with the another end of the outdoor heat exchanger through the second electromagnetic valve, the another end of the indoor exchanger is connected with the second end of the compression assembly; and the controller is electrically connected with the first to the third electromagnetic valves and configured to control the opening and closing of the first to third electromagnetic valves.

In a second aspect, some embodiments of the present disclosure provide an air conditioning heat pump system using an ejector, comprising a compression assembly, an outdoor heat exchanger, a first throttle device, an indoor heat exchanger and an ejector, wherein an injection inlet of the ejector is connected with another end of the indoor heat exchanger, a jet inlet of the ejector is connected with one end of the outdoor heat exchanger, an outlet end of the ejector is connected with a third end of the compression assembly, a first end of the compression assembly is connected with the one end of the outdoor heat exchanger, a second end of the compression assembly is connected with one end of the indoor heat exchanger, one end of the first throttle device is connected with another end of the outdoor heat exchanger, and another end of the first throttle device is connected with the another end of the indoor heat exchanger, wherein the air conditioning heat pump system using an ejector further comprises: a controllable valve for controlling the flow direction arranged on a pipe between the first end of the compression assembly and the one end of the outdoor heat exchanger, a first electromagnetic valve arranged on a pipe between the jet inlet of the ejector and the one end of the outdoor heat exchanger, a second electromagnetic valve arranged on a pipe between the another end of the first throttle device and the another end of the indoor heat exchanger, a third electromagnetic valve arranged on a pipe between the injection inlet of the ejector and the another end of the indoor heat exchanger, a first check valve arranged on a pipe between the third end of the compression assembly and the outlet end of the ejector, a second check valve arranged on a pipe between a fourth end of the compression assembly and the another end of the first throttle device, and a controller, wherein a flow direction of the first check valve is from the outlet end of the ejector to the third end of the compression assembly;

a flow direction of the second check valve is from the fourth end of the compression assembly to the another end of the first throttle device;

the controllable valve is in an open state in order that a refrigerant flows from the first end of the compression assembly to the one end of the outdoor heat exchanger;

the controller is configured to control opening and closing of the first electromagnetic valve, the second electromagnetic valve, and the third electromagnetic valve according to a current operating mode; and wherein, the first throttle device may be one of an electronic expansion valve, an electronic expansion tube, or a capillary tube.

In a third aspect, some embodiments of the present disclosure provide an outdoor unit of an air conditioner, comprising a compression assembly, an outdoor heat exchanger, a first throttle device and an ejector, wherein an injection inlet of the ejector is configured to be connected with another end of an indoor heat exchanger, a jet inlet of the ejector is connected with one end of the outdoor heat exchanger, an outlet end of the ejector is connected with a third end of the compression assembly, a first end of the compression assembly is connected with the one end of the outdoor heat exchanger, a second end of the compression assembly is configured to be connected with one end of the indoor heat exchanger, one end of the first throttle device is connected with another end of the outdoor heat exchanger, and another end of the first throttle device is configured to be connected with the another end of the indoor heat exchanger, wherein the air conditioning heat pump system using an ejector further comprises: a controllable valve for controlling the flow direction arranged on a pipe between the first end of the compression assembly and the one end of the outdoor heat exchanger, a first electromagnetic valve arranged on a pipe between the jet inlet of the ejector and the one end of the outdoor heat exchanger, a second electromagnetic valve arranged on a pipe configured to be between the another end of the first throttle device and the another end of the indoor heat exchanger, a third electromagnetic valve arranged on a pipe configured to be between the injection inlet of the ejector and the another end of the indoor heat exchanger, a first check valve arranged on a pipe between the third end of the compression assembly and the outlet end of the ejector, a second check valve arranged on a pipe between a fourth end of the compression assembly and the another end of the first throttle device, and a controller, wherein a flow direction of the first check valve is from the outlet end of the ejector to the third end of the compression assembly;

a flow direction of the second check valve is from the fourth end of the compression assembly to the another end of the first throttle device;

the controllable valve is in an open state in order that a refrigerant flows from the first end of the compression assembly to the one end of the outdoor heat exchanger; and the controller is configured to control opening and closing of the first electromagnetic valve, the second electromagnetic valve, and the third electromagnetic valve according to a current operating mode.

BRIEF DESCRIPTION OF THE DRAWINGS

In order to describe technical solutions in embodiments of the present disclosure more clearly, the accompanying drawings to be used in the description of embodiments or the prior art will be introduced briefly. Obviously, the accompanying drawings to be described below are merely some embodiments of the present disclosure, and a person of ordinary skill in the art can obtain other drawings according to those drawings without paying any creative effort.

DETAILED DESCRIPTION

The technical solutions in the embodiments of the present disclosure will be described clearly and completely with reference to the accompanying drawings in the embodiments of the present disclosure. Obviously, the described embodiments are merely some but not all of embodiments of the present disclosure. All other embodiments made on the basis of the embodiments of the present disclosure by a person of ordinary skill in the art without paying any creative effort shall be included in the protection scope of the present disclosure.

In order to enable a person skilled in the art to better understand the technical solutions of the present disclosure, the present disclosure will be further described in detail below in combination with the accompanying drawings and specific embodiments.

In embodiments of the present disclosure, terms "disposed", "connected", "connection", etc. shall be understood in a broad sense, unless otherwise explicitly defined or limited. For example, it may be a fixed connection, a detachable connection, or an integral connection; it may be a mechanical connection or an electrical connection; it may be directly connected or indirectly connected through an intermediate medium; it may be internal connection of two elements or interaction of two elements. Specific meanings of the above terms in the present disclosure can be understood by a person skilled in the art on a case-by-case basis.

Figure 1:
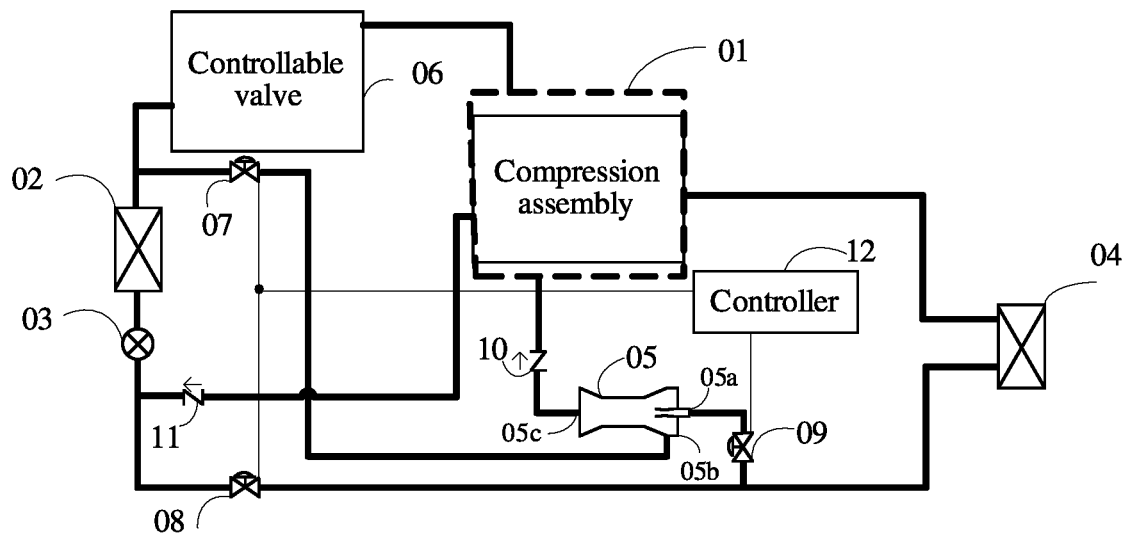
FIG. 1 is a schematic structural diagram of an air conditioning heat pump system using an ejector according to some embodiments of the present disclosure.

Some embodiments of the present disclosure provide an air conditioning heat pump system using an ejector. As shown in FIG. 1, the air conditioning heat pump system using an ejector includes a compression assembly 01, an outdoor heat exchanger 02, an indoor heat exchanger 04, an ejector 05, a first electromagnetic valve 07, a second electromagnetic valve 08, and a third electromagnetic valve 09 and a controller 12; a first end of the compression assembly 01 is connected with the one end of the outdoor heat exchanger 02, a second end is connected with one end of the indoor heat exchanger 04, a third end is connected with outlet end of the ejector 05, a fourth end is connected with another end of the outdoor heat exchanger 02. One end of the outdoor heat exchanger 02 is also connected with a jet inlet of the ejector 05 through the first electromagnetic valve 07, another end is also connected with the injection inlet of the ejector 05 through the second electromagnetic valve and the third electromagnetic valve. Another end of the indoor heat exchanger 04 is connected with an injection inlet of the ejector 05 through the third electromagnetic valve 09, the one end is connected with the second end of the compression assembly 01. The ejector 05 includes three ports: an injection inlet 05a, a jet inlet 05b, and an outlet end 05c. The injection inlet 05a of the ejector 05 is connected with another end of the indoor heat exchanger 04, and the jet inlet 05b of the ejector is connected with one end of the outdoor heat exchanger 02, and the outlet end 05c of the ejector 05 is connected with a third end of the compression assembly 01. A first end of the compression assembly 01 is connected with the one end of the outdoor heat exchanger 02, and a second end of the compression assembly 01 is connected with one end of the indoor heat exchanger 04. The first electromagnetic valve 07 is arranged on a pipe between jet inlet 05b of the ejector 05 and one end of the outdoor heat exchanger 02, the second electromagnetic valve 08 is arranged on a pipe between another end of the first throttle device 03 and another end of the indoor heat exchanger 04, the third electromagnetic valve 09 is arranged on a pipe between injection inlet 05a of the ejector 05 and another end of the indoor heat exchanger 04. The controller is electrically connected with the first to the third electromagnetic valve.

In a first operating mode, the controller 12 controls the first electromagnetic valve 07 and the third electromagnetic valve 09 to close, and controls the second electromagnetic valve 08 to open, a refrigerant in the air conditioning heat pump system flows out of the compression assembly 01, and flows back to the compression assembly 01 after sequentially flows through the outdoor heat exchanger 02 and the indoor heat exchanger 04;

In a second operating mode, the controller 12 controls the first electromagnetic valve 07 and the third electromagnetic valve 09 to close, and controls the second electromagnetic valve 08 to open, a refrigerant in the air conditioning heat pump system flows out of the compression assembly 01 and flows back to the compression assembly 01 after sequentially flows through the indoor heat exchanger 02 and the outdoor heat exchanger 04;

In a third operating mode, the controller 12 is configured to control the first electromagnetic valve 07 and the third electromagnetic valve 09 to open, and control the second electromagnetic valve 08 to close, a refrigerant in the air conditioning heat pump system flows out of the compression assembly 01, and flows to the ejector 05 after respectively flows through the indoor heat exchanger 04 and the outdoor heat exchanger 02, and reflows back to the compression assembly 01 after flows through the ejector 05. The third operating mode is the low-temperature heating mode operated in which the ejector 05 operates, the low-temperature heating mode will be described in detail below with reference to FIG. 6.

It should be noted that the difference between the common heating mode and the low-temperature heating mode is whether the ejector is working. The applicable scenarios of the two modes are as follows: when the outdoor temperature is lower than the first predetermined temperature and higher than the second predetermined temperature, the common heating mode is applied; when the outdoor temperature is lower than the second predetermined temperature, the low-temperature heating mode can be applied. For example, when the first predetermined temperature is set as +° C. and the second predetermined t temperature is set as 0°, the temperature in the southern winter is generally between 0° C. and +6° C., in this case, the common heating mode is applied; the temperature in the northern winter is generally below 0° C., in this case, the low-temperature heating mode is applied.

In addition, the air conditioning heat pump system using an ejector further includes: a first throttle device 03, a controllable valve 06 for controlling the flow direction arranged on a pipe between the first end of the compression assembly 01 and the one end of the outdoor heat exchanger 02, a first check valve 10 arranged on a pipe between the third end of the compression assembly 01 and the outlet end 05c of the ejector 05, a second check valve 11 arranged on a pipe between a fourth end of the compression assembly 01 and the another end of the first throttle device 03, One end of the first throttle device 03 is connected with another end of the outdoor heat exchanger 02, another end of the first throttle device 03 is connected with on end of the indoor heat exchanger 04.

The controllable valve 06 is in an open state in order that refrigerant flows from the first end of the compression assembly 01 to the one end of the outdoor heat exchanger 02, or the controllable valve 06 is in an open state in order that refrigerant flows from one end of the outdoor heat exchanger 02 to a third end of the compression assembly 01. A flow direction of the first check valve 10 is from the outlet end 05c of the ejector 05 to the third end of the compression assembly 01. A flow direction of the second check valve 11 is from the fourth end of the compression assembly 01 to the another end of the first throttle device 03. The controller 12 is configured to control opening and closing of the first electromagnetic valve 07, the second electromagnetic valve 08, and the third electromagnetic valve 09 according to a current operating mode.

For example, the controller 12 may be implemented in a general processor that executes machine readable instructions stored in non-transitory memory such that it can perform the functions described in detail herein. In other examples, the controller can be implemented in a special processor, such as an application specific integrated circuit (ASIC), which is configured to perform the functions described in detail herein.

Figure 3:
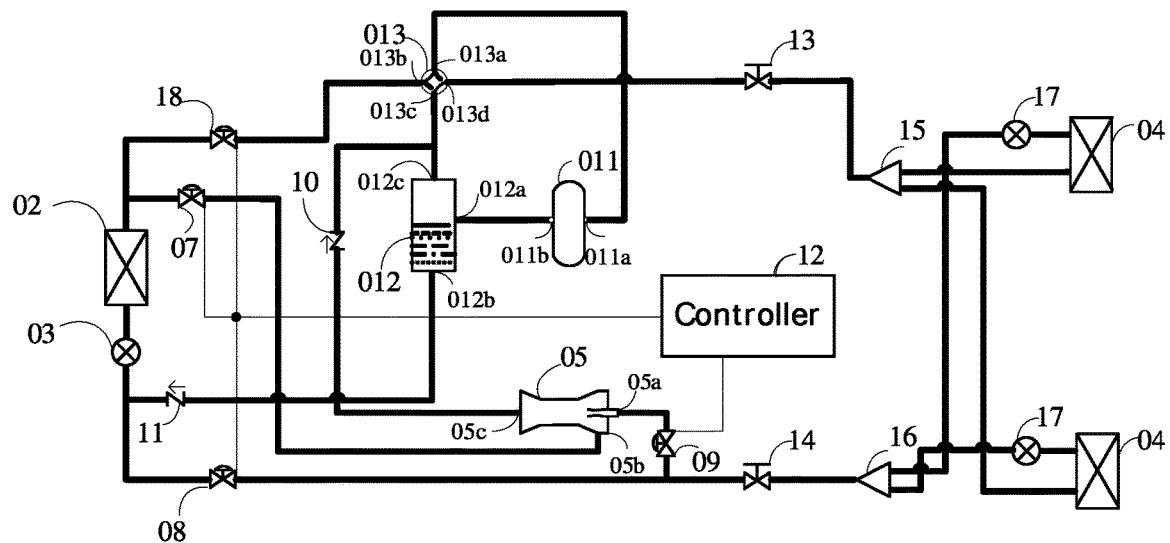
FIG. 3 is a schematic structural diagram of an air conditioning heat pump system using an ejector according to some embodiments of the present disclosure.

For example, when the air conditioning heat pump system using an ejector described above is a home air conditioning system (i.e., including only one indoor heat exchanger 04), the first throttle device 03 may be a capillary or an electronic expansion valve, and, as shown in FIG. 1 and FIG. 3, a gas-side shutoff valve 13 is disposed on the pipe between one end of the indoor heat exchanger 04 and the second end of the compression assembly 01, and a liquid-side shutoff valve 14 is disposed in the pipe between another end of the indoor heat exchanger 04 and the second electromagnetic valve 08.

When the air conditioning heat pump system using an ejector is a multi-line system (i.e., having multiple indoor heat exchangers 04), the first throttle device 03 may be an electronic expansion tube, and, as shown in FIG. 3, a gas-side shutoff valve 13 disposed on the pipe between another end of the indoor heat exchanger 04 and the second end of the compression assembly 01 is connected with multiple indoor heat exchangers 04 through a gas-side branch tube 15, and a liquid-side shutoff valve 14 disposed in the pipe between another end of the indoor heat exchanger 04 and the second electromagnetic valve 08 is connected with multiple indoor heat exchanger 04 through a liquid-side branch tube 16.

Optionally, when the air conditioning heat pump system using an ejector is a multi-line system, as shown in FIG. 3, the air conditioning heat pump system using an ejector in the embodiment of the present disclosure further includes a multiple second throttle devices 17. Each of the multiple second throttle devices 17 is disposed on a pipe between the liquid-side shutoff valve 14 and one end of a corresponding one of the plurality of indoor heat exchangers 04.

Each of the multiple second throttle devices 17 is configured to control the flow rate of the refrigerant in the pipe between a corresponding one of the multiple indoor heat exchangers 04 and the injection inlet 05a of the ejector 05.

Figure 2:
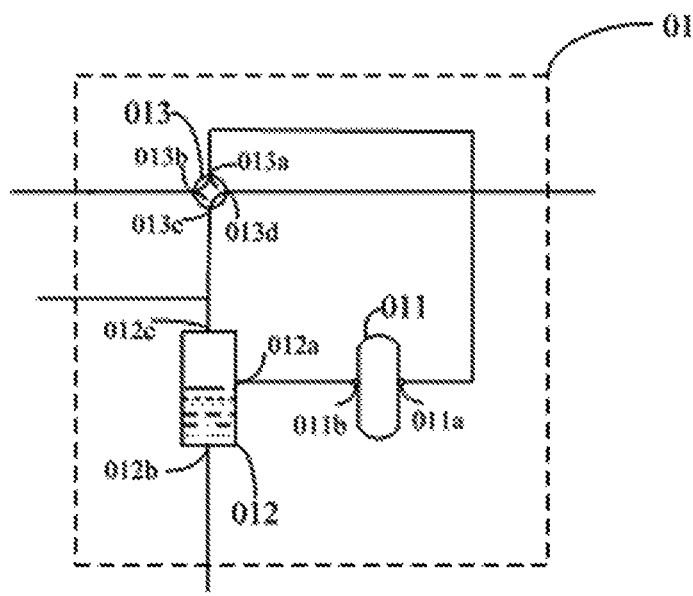
FIG. 2 is a schematic structural diagram of a compression assembly according to some embodiments of the present disclosure.

For example, as shown in FIG. 2, the compression assembly 01 in embodiments of the present disclosure includes a compressor 011, a separator 012, and a four-way valve 013. The compressor 011 includes an exhaust port 011a and an intake port 011b. The separator 012 includes a gas outlet end 012a, a liquid outlet end 012b, and an inlet end 012c. The four-way valve 013 includes a first port 013a, a second port 013b, a third port 013c, and a fourth port 013d.

The first port 013a is connected with the exhaust port 011a of the compressor 011. The second port 013b is connected with the one end of the outdoor heat exchanger 02. The third port 013c is connected with the inlet end 012c of the separator 012. The fourth port 013d is connected with the another end of the indoor heat exchanger 04. The intake port 011b of the compressor 011 is connected with the gas outlet end 012a of the separator 012. The liquid outlet end 012b of the separator 012 is connected with the another end of the first throttle device 03.

For example, referring to FIG. 3, which is a schematic structural diagram of an air conditioning heat pump system using an ejector according to another embodiment of the present disclosure, in a case where the controllable valve 06 is a fourth electromagnetic valve 18, the controller 12 is further configured to control opening and closing of the fourth electromagnetic valve 18. In an example, the controller 12 is configured to: in a cooling mode, control the fourth electromagnetic valve 18 and the second electromagnetic valve 08 to open the pipe, and control the first electromagnetic valve 07 and the third electromagnetic valve 09 to close the pipe; or, in a normal heating mode, control the fourth electromagnetic valve 18 and the second electromagnetic valve 08 to open the pipe, and control the first electromagnetic valve 07 and the third electromagnetic valve 09 to close the pipe; or, in a low-temperature heating mode, control the fourth electromagnetic valve 18 and the second electromagnetic valve 08 to close the pipe, and control the first electromagnetic valve 07 and the third electromagnetic valve 09 to open the pipe.

Figure 4:
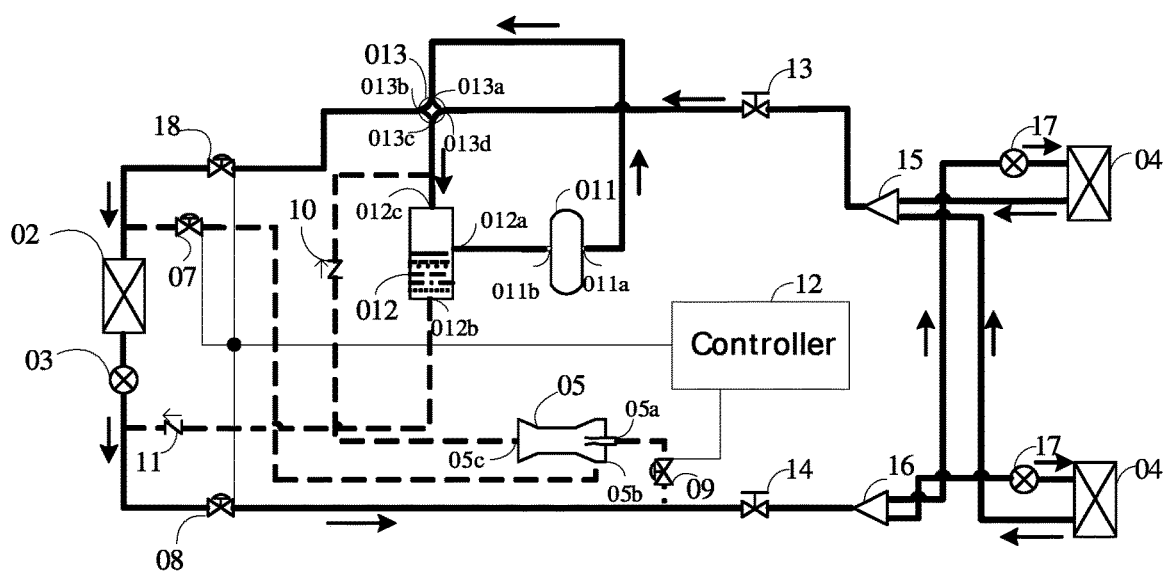
FIG. 4 is a diagram showing a flow direction of refrigerant in a cooling mode in the air conditioning heat pump system using an ejector shown in FIG. 3.

In an example, according to FIG. 4, which shows a flow direction of refrigerant in the cooling mode, it is known that in the cooling mode, the compressor 011 compresses a low-temperature low-pressure gas refrigerant into a high-temperature high-pressure gas refrigerant, and discharges the high-temperature high-pressure gas refrigerant through the exhaust port 011a. The high-temperature and high-pressure gas refrigerant sequentially passes through the first port 013a and the second port 013b of the four-way valve 013 and the fourth electromagnetic valve 18, and enters the outdoor heat exchanger 02. In this case, the outdoor heat exchanger 02 serves as a condenser, and condenses the high-temperature high-pressure gas refrigerant into a medium-temperature high-pressure liquid refrigerant. Then, the medium-temperature high-pressure liquid refrigerant enters the first throttle device 03 to be depressurized. Then, the liquid refrigerant flows through the second electromagnetic valve 08, a liquid-side shutoff valve 14, a liquid side branch pipe 16, and the second throttle device 17, and enters the indoor heat exchanger 04. The indoor heat exchanger 04 serves as an evaporator, evaporating a low-temperature and low-pressure liquid refrigerant into a low-temperature and low-pressure gas refrigerant, and cooling down the indoor environment. Thereafter, the refrigerant sequentially passes through a gas side branch pipe 15, a gas-side shutoff valve 13, the fourth port 013d and the third port 013c of the four-way valve 013, and the inlet end 012c of the separator 012, and enters the separator 012.

It will be noted that in the above cooling mode, the ejector 05 does not operate.

Figure 5:
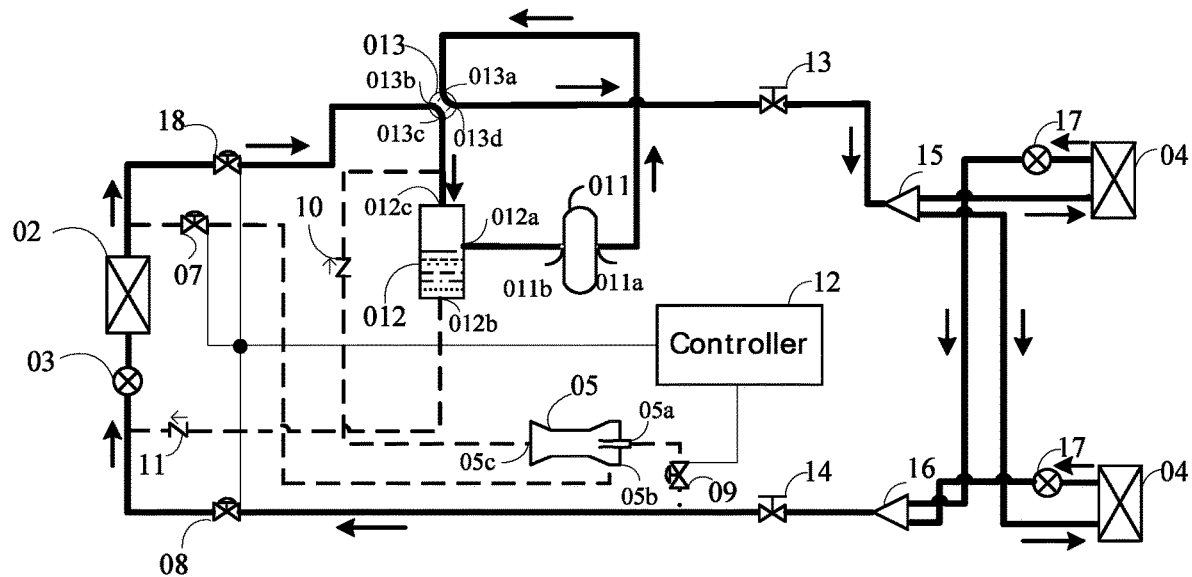
FIG. 5 is a diagram showing a flow direction of refrigerant in a normal heating mode in the air conditioning heat pump system using an ejector shown in FIG. 3.

In an example, according to the refrigerant flow diagram in the cooling mode as shown in FIG. 5, in the normal heating mode, the compressor 011 compresses the low-temperature low-pressure gas refrigerant into a high-temperature high-pressure gas refrigerant, and the high-temperature high-pressure gas refrigerant is discharged through the exhaust port 011a. The high-temperature and high-pressure gas refrigerant sequentially passes through the first port 013a and the second port 013b of the four-way valve 013 and a gas-side shutoff valve 13 and gas-side branch tube 15, and enters the indoor heat exchanger 04. The indoor heat exchanger 04 serves as a condenser, and condenses the high-temperature high-pressure gas refrigerant into a medium-temperature high-pressure liquid refrigerant. The medium-temperature high-pressure liquid refrigerant heat the indoor environment. Thereafter, the liquid refrigerant sequentially flows through the second throttle device 17, the liquid-side branch pipe 16, the liquid-side shutoff valve 14, the second electromagnetic valve 08, and the first throttle device 03 to enter the outdoor heat exchanger 02. The outdoor heat exchanger 02 serves as an evaporator to evaporate the liquid refrigerant into a gas refrigerant. The gas refrigerant sequentially flows through the fourth electromagnetic valve 18, the second port 013b of the four-way valve 013, the third port 013c, and the inlet end 012c of the separator 012, and enters the separator 012.

It will be noted that in the above heating mode, the ejector 05 does not operate.

Figure 6:
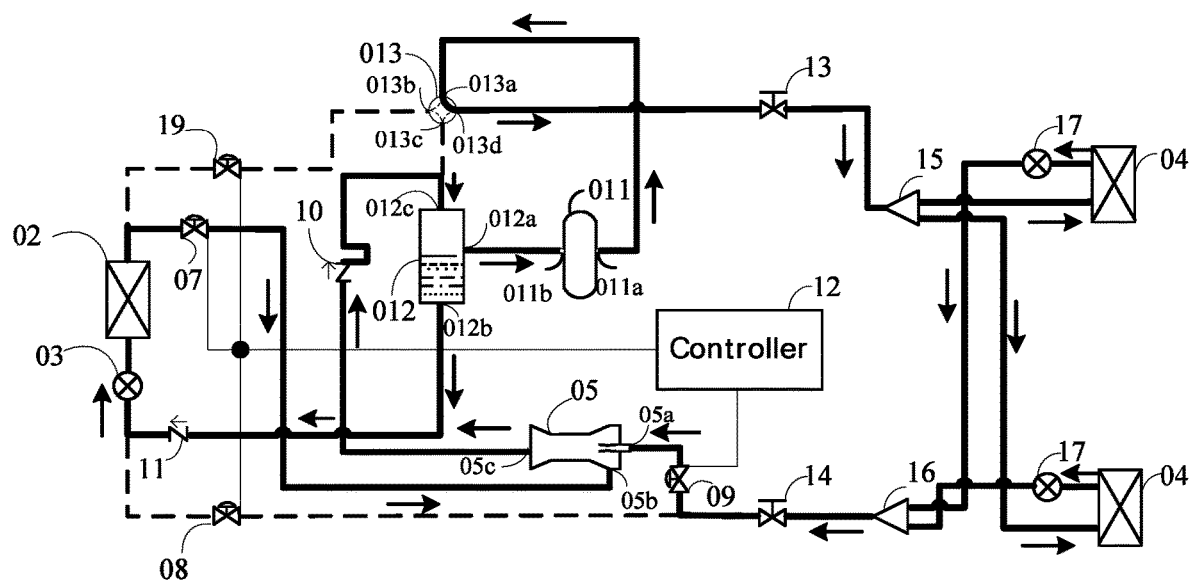
FIG. 6 is a diagram showing a flow direction of refrigerant in a low-temperature heating mode in the air conditioning heat pump system using an ejector shown in FIG. 3.
Figure 7:
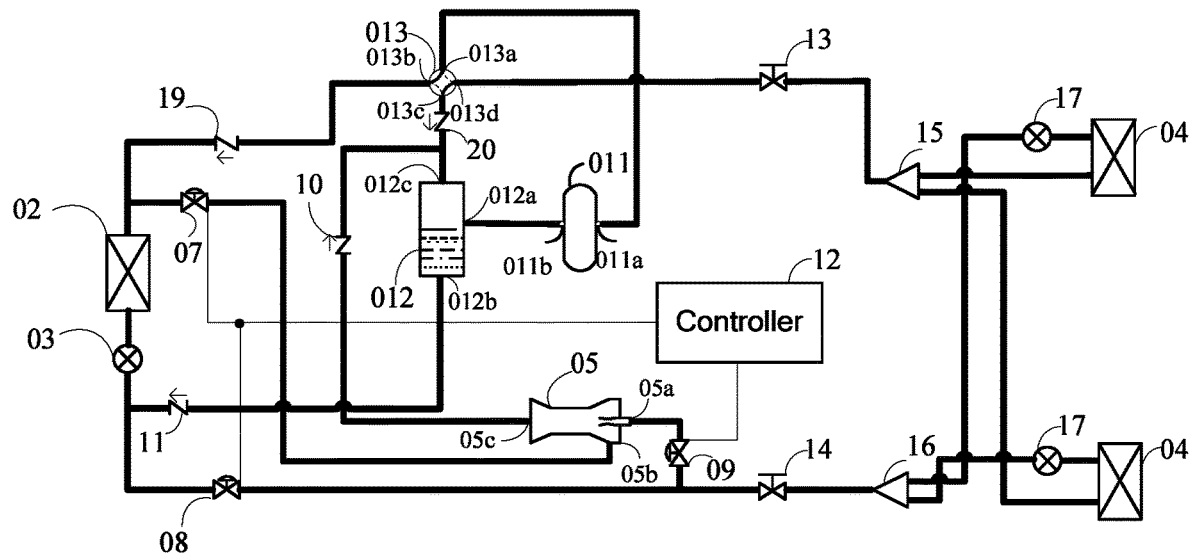
FIG. 7 is a schematic structural diagram of an air conditioning heat pump system using an ejector according to some embodiments of the present disclosure.

In an example, according to the refrigerant flow diagram in the low-temperature heating mode shown in FIG. 6, the high-temperature and high-pressure gas refrigerant discharged from the exhaust port 011a of the compressor 011 sequentially flows through the first port 013a and the fourth port 013d of the four-way valve 013, and enters the indoor heat exchanger through the gas-side shutoff valve 13 and the gas-side branch tube 15. The indoor heat exchanger 04 serves as a condenser, and condenses the high-temperature high-pressure gas refrigerant into a medium-temperature high-pressure liquid refrigerant. The medium-temperature high-pressure liquid refrigerant heats the indoor environment. Then, the liquid refrigerant flows through the second throttle device 17, the liquid-side branch pipe 16, the liquid-side shutoff valve 14, and the third electromagnetic valve 09 to enter the injection inlet 05a of the ejector 05. The throttle of the nozzle inside the ejector 05 creates a low pressure environment inside the ejector, thereby attracting the refrigerant of the jet inlet 05b of the ejector 05 into the ejector 05. The mixed refrigerant passes through the mixing section and the diffusion section of the ejector 05 to increase the outlet pressure of the ejector 05. Next, the refrigerant flowing out of the outlet end 05c of the ejector 05 passes through the first check valve 10 and enters the inlet end 012c of the separator 012. The gas refrigerant flowing from the gas outlet end 012a of the separator 012 enters the compressor 011, thereby increase the suction pressure of the compressor 011. The liquid refrigerant flowing out from the liquid outlet end 012b of the separator 012 sequentially flows through the second check valve 11, the first throttle device 03, the outdoor heat exchanger 02, and the first electromagnetic valve 07, and then returns to the jet inlet of the ejector 05.

It will be noted that in the above low-temperature heating mode, the ejector 05 operates.

It will be noted that the ejector can recover the expansion work of the air conditioning system to reduce the power consumption of the compressor operation. The ejector reduces the high pressure refrigerant entering through the injection inlet through the throttling of the internal nozzle of the ejector to form a low pressure environment, thereby attracting the low pressure refrigerant of jet inlet of the ejector enters the suction chamber of the ejector to be mixed. And then through the action of the mixing section and the diffusion section, a pressure centered refrigerant is formed, thereby increasing the intake port pressure of the compressor and reducing the power consumption of the compressor.

For example, referring to a schematic structural diagram of an air conditioning heat pump system using an ejector provided by another embodiment of the present disclosure, when the controllable valve 06 is the third check valve 19, the air conditioning heat pump system using an ejector further includes a fourth check valve 20, and the fourth check valve 20 is disposed on a pipe between the third port 013*c* of the four-way valve 013 and the inlet end 012*c* of the separator 012. The flow direction of the third check valve 19 is from the second port 013*b* of the four-way valve 013 to one end of the outdoor heat exchanger 02, and the flow direction of the fourth check valve 20 is from the third port 013*c* of the four-way valve 013 to the inlet end 012*c* of the separator 012. In an example, the controller is configured to: control the second electromagnetic valve 08 to close the pipe and control the first electromagnetic valve 07 and the third electromagnetic valve 09 to close the pipe in the cooling mode, control the fourth electromagnetic valve 07 and the third electromagnetic valve 09 to open the pipe, and control the second electromagnetic valve 08 to close the pipe in the heating mode.

Figure 8:
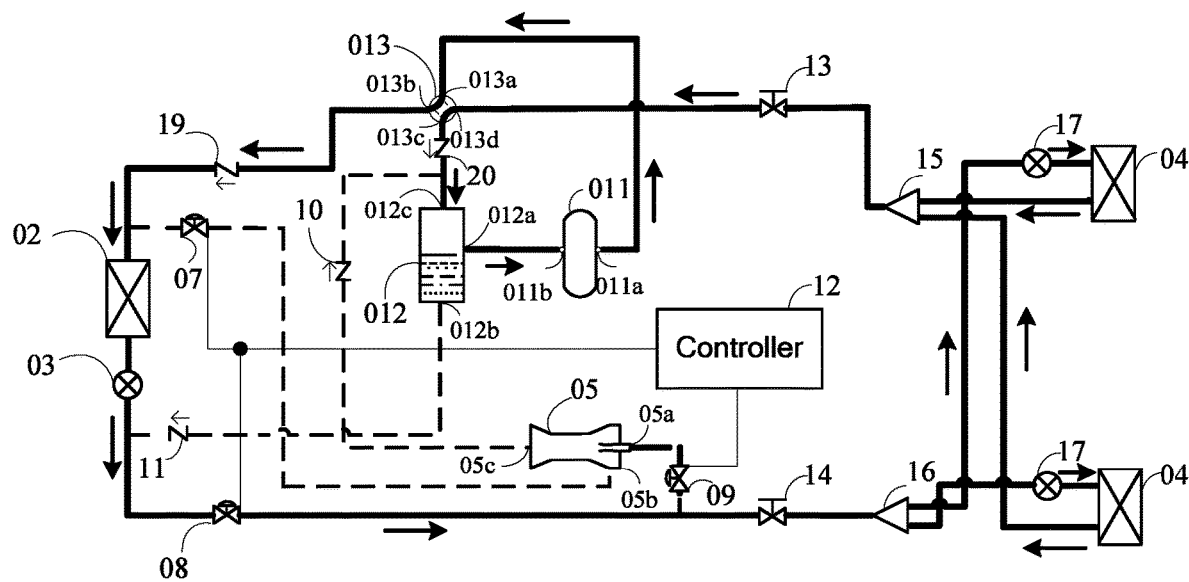
FIG. 8 is a diagram showing a flow direction of refrigerant in a cooling mode in the air conditioning heat pump system using an ejector shown in FIG. 7.

In an example, according to the refrigerant flow diagram in the cooling mode as shown in FIG. 8, the pipe between the third port 013*c* of the four-way valve 013 and the inlet end 012*c* of the separator 012 is opened, Therefore, the circulation process of the refrigerant corresponding to FIG. 8 is the same as the refrigerant circulation process corresponding to FIG. 4, and details are not described herein again.

Figure 9:
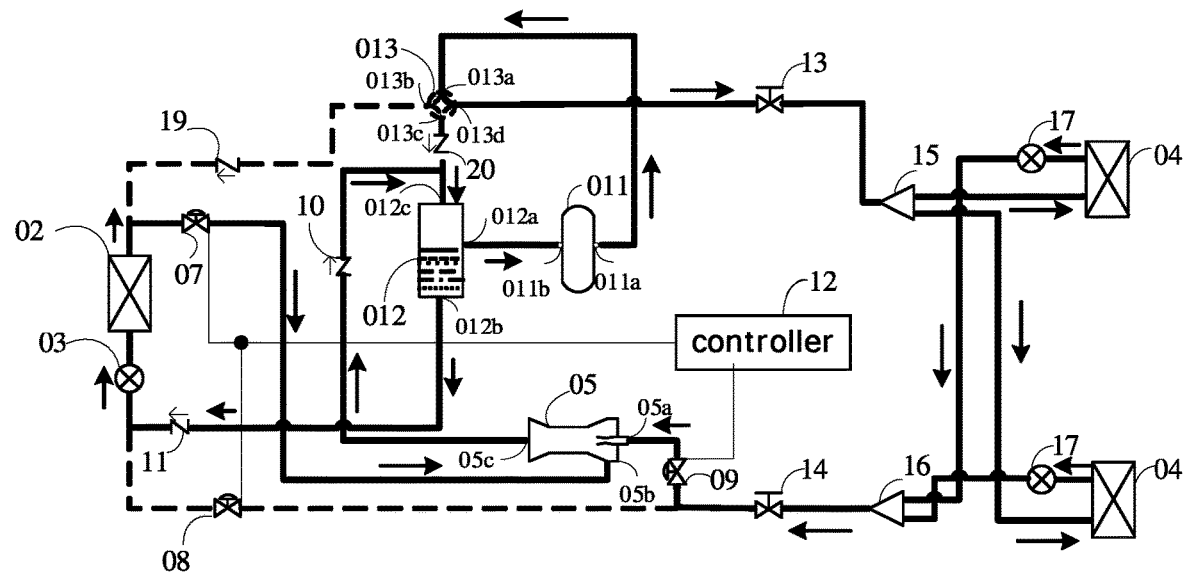
FIG. 9 is a diagram showing a flow direction of refrigerant in a heating mode in the air conditioning heat pump system using an ejector shown in FIG. 7.

In an example, according to the refrigerant flow diagram in the heating mode as shown in FIG. 9, the circulation process of the refrigerant corresponding to FIG. 9 is the same as the refrigerant circulation process corresponding to FIG. 6, and will not be described again here.

The air conditioning heat pump system using an ejector provided by the embodiment of the present disclosure adds a first electromagnetic valve 07 disposed on a pipe between the jet inlet 05*b* of the ejector 05 and one end of the outdoor heat exchanger 02, a second electromagnetic valve 08 disposed on a pipe between the another end of the first throttle device 03 and another end of the indoor heat exchanger 04, a third electromagnetic valve 09 disposed on the pipe between the injection inlet 05*a* of the ejector 05 and another end of the indoor heat exchanger 04, and the controller 12, therefore, the cooling mode and the heating mode are realized by the controller 12 controlling the opening and closing of the first electromagnetic valve 07, the second electromagnetic valve 08, and the third electromagnetic valve 09 in different operating modes.

Figure 10:
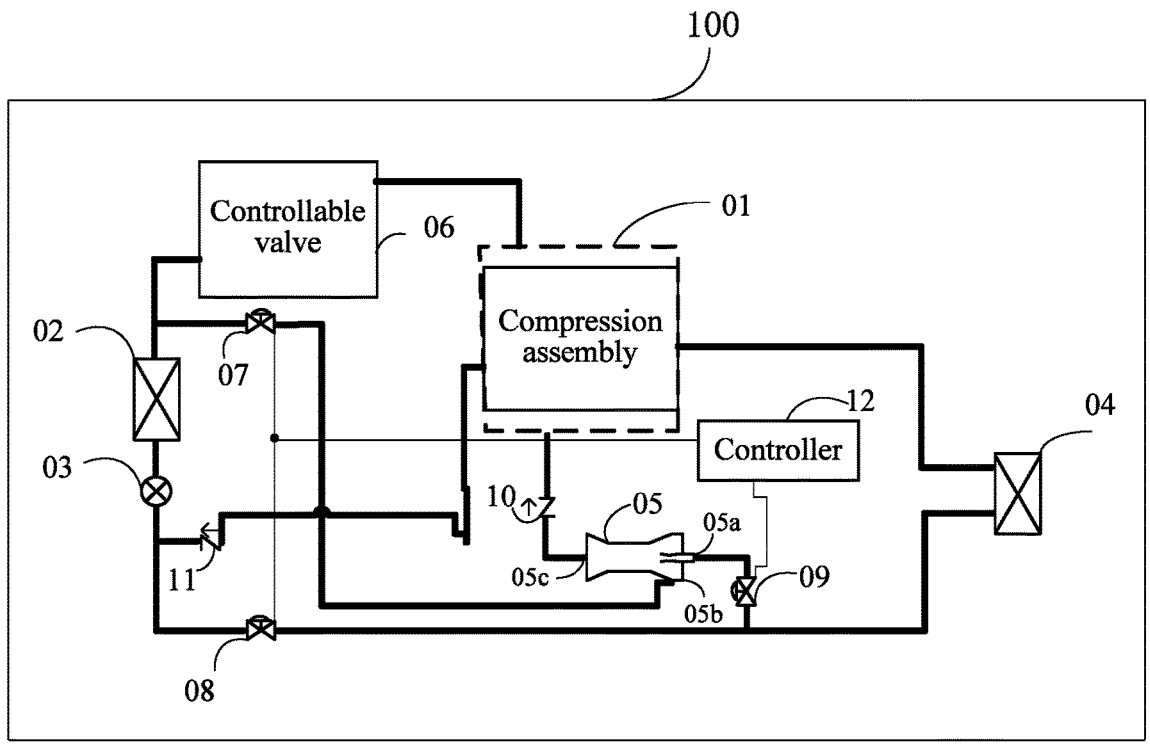
FIG. 10 is a schematic structural diagram of an air conditioner according to some embodiments of the present disclosure.

The embodiment of the present disclosure provides an air conditioner 100, as shown in FIG. 10, which includes the above-described air conditioning heat pump system using an ejector.

For example, the above description of the components of the air conditioner 100 and the description of the components in the air conditioner 100 can be referred to the above description of the air conditioning heat pump system using an ejector, and details are not described herein again.

An air conditioner control method provided by an embodiment of the present disclosure will be described below based on the related description of the air conditioning heat pump system using an ejector in the above embodiment. For the description of the technical terms, concepts, and the like related to the above embodiments in the following embodiments, reference may be made to the above embodiments, and details are not described herein again.

The air conditioner control method provided by the embodiment of the present disclosure includes:

300*a*: The controller controls the first and the third electromagnetic valve to close, and control the second electromagnetic valve to open, a refrigerant in the air conditioning heat pump system flows out of the compression assembly, and flows back to the compression assembly after sequentially flows through the outdoor heat exchanger and the indoor heat exchanger, in order to apply the air conditioning heat pump system in the first operating mode; or

300*b*: The controller controls the first and the third electromagnetic valve to close, and control the second electromagnetic valve to open, a refrigerant in the air conditioning heat pump system flows out of the compression assembly, and flows back to the compression assembly after sequentially flows through the indoor heat exchanger and the outdoor heat exchanger, in order to apply the air conditioning heat pump system in the second operating mode; or

300*c*: The controller controls the first and the third electromagnetic valve to open, and control the second electromagnetic valve to close, a refrigerant in the air conditioning heat pump system flows out of the compression assembly, and flows back to the ejector after respectively flows through the indoor heat exchanger and the outdoor heat exchanger, and reflows back to the compression assembly after flows through the ejector, in order to apply the air conditioning heat pump system in the third operating mode.

The first operating mode is a cooling mode; the second operating mode is a common heating mode in which the ejector does not work; the third operating mode is a low-temperature heating mode in which the ejector works.

In some embodiments, when the flow control valve in the air conditioner is realized as the fourth electromagnetic valve, the controller is further configured to control the opening and closing of the fourth electromagnetic valve, the air conditioning control method further including:

301*a*: In a first operating mode, the controller controls the fourth electromagnetic valve to open, the refrigerant flows from the first end of the compression assembly to one end of the outdoor heat exchanger.

301*b*: in a second operating mode, the controller controls the fourth electromagnetic valve to open, the refrigerant flows from one end of the outdoor heat exchanger to the third end of the compression assembly.

301*c*, In a third operating mode, the controller controls the fourth electromagnetic valve to close.

In some embodiments, when the flow control valve in the air conditioner is the third one-way valve, the flow direction of the third check valve flows from the first end of the compression assembly to one end of the outdoor heat exchanger, and the air conditioner is further includes a fourth check valve, and the flow direction of the fourth check valve flows from the third port of the four-way valve to the inlet end of the separator. At this time, the air conditioning control method further including:

S302*a*: in the first operating mode, the controller controls the second electromagnetic valve to open the pipe and controls the first electromagnetic valve and the third electromagnetic valve to close the pipe;

S302b: in the second and the third operating mode the controller controls the first electromagnetic valve and the third electromagnetic valve to open and the second electromagnetic valve to close.

The air conditioning heat pump system using an ejector provided by the embodiment of the present disclosure adds a first electromagnetic valve disposed on a pipe between the jet inlet of the ejector and one end of the outdoor heat exchanger, a second electromagnetic valve disposed on a pipe between the another end of the first throttle device and another end of the indoor heat exchanger, a third electromagnetic valve disposed on the pipe between the injection port of the ejector and another end of the indoor heat exchanger, a first check valve disposed on the pipe between the third end of the compression assembly and the outlet end of the ejector, the channel and the controller. Therefore, the cooling mode and the heating mode are realized by the controller controlling the opening and closing of the first electromagnetic valve, the second electromagnetic valve, and the third electromagnetic valve in different operating modes.

The above embodiments are only used to explain the technical solutions of the present application, and are not intended to limit the present application. Although the present application has been described in detail with reference to the foregoing embodiments, those skilled in the art should understand that the technical solutions described in the foregoing embodiments may be modified or equivalently substituted for some of the technical features. And the modifications and substitutions of the present invention do not depart from the spirit and scope of the technical solutions of the embodiments of the present application.

We claim:

1. An air conditioning system, comprising:
   a compression assembly;
   an outdoor heat exchanger;
   an indoor heat exchanger;
   an ejector; and
   a first to third electromagnetic valves and a controller,
   wherein a first end of the compression assembly is connected with one end of the outdoor heat exchanger, a second end of the compression assembly is connected with one end of the indoor heat exchanger, a third end of the compression assembly is connected with an outlet end of the ejector, and a fourth end of the compression assembly is connected with another end of the outdoor heat exchanger,
   wherein the one end of the outdoor heat exchanger is also connected with a jet inlet of the ejector through a first electromagnetic valve, the first electromagnetic valve is a two-way valve, and the another end of the outdoor exchanger is also connected with an injection inlet of the ejector through the second electromagnetic valve and the third electromagnetic valve,
   wherein another end of the indoor heat exchanger is connected with an injection inlet of the ejector through the third electromagnetic valve and connected with the another end of the outdoor heat exchanger through the second electromagnetic valve, and the another end of the indoor exchanger is connected with the second end of the compression assembly, and
   wherein the controller is electrically connected with the first to the third electromagnetic valves and configured to control the opening and closing of the first to third electromagnetic valves.

2. The air conditioning system according to claim 1, wherein the controller controls the opening and/or closing of the first to third electromagnetic valves and includes any one of the following three modes:
   in a first operating mode, the controller is configured to control the first and the third electromagnetic valve to close, and control the second electromagnetic valve to open, a refrigerant in the air conditioning system flows out of the first end of the compression assembly, and flows back to the second end of the compression assembly after sequentially flows through the outdoor heat exchanger and the indoor heat exchanger;
   in a second operating mode, the controller is configured to control the first and the third electromagnetic valve to close, and control the second electromagnetic valve to open, a refrigerant in the air conditioning system flows out of the second end of the compression assembly, and flows back to the first end of the compression assembly after sequentially flows through the indoor heat exchanger and the outdoor heat exchanger; and
   in a third operating mode, the controller is configured to control the first and the third electromagnetic valve to open, and control the second electromagnetic valve to close, a refrigerant in the air conditioning system respectively flows out of the second end and the fourth end of the compression assembly, and flows to the ejector after respectively flows through the indoor heat exchanger and the outdoor heat exchanger, and reflows back to the third end of the compression assembly after flows through the ejector.

3. The air conditioning system according to claim 2, wherein the compression assembly comprises a compressor, a separator, and a four-way valve, the four-way valve comprising a first port, a second port, a third port, and a fourth port,
   wherein the compressor comprises an intake port and an exhaust port, the intake port is connected with a gas outlet end of the separator, and the exhaust port is connected with the first port of the four-way valve,
   wherein the separator comprises a liquid outlet end, a gas outlet end, and an inlet end, wherein the liquid outlet end is connected with another end of the outdoor heat exchanger as the fourth end of the compression assembly, and wherein the inlet end is connected with outlet end of the ejector as the third end of the compression assembly, and
   wherein the second port is connected with the one end of the outdoor heat exchanger as the first end of the compression assembly, the third port is connected with the inlet end of the separator, and the fourth port is connected with the another end of the indoor heat exchanger as the second end of the compression assembly.

4. The air conditioning system according to claim 2, wherein a controllable valve for controlling the flow direction is arranged on a pipe between the first end of the compression assembly and the one end of the outdoor heat exchanger,
   wherein the controllable valve is configured such that the controllable valve is in an open state to allow refrigerant to flow from the first end of the compression assembly to the one end of the outdoor heat exchanger, or
   wherein the controllable valve is configured such that the controllable valve is in an open state to allow refrigerant to flow from one end of the outdoor heat exchanger to the first end of the compression assembly.

5. The air conditioning system according to claim 4,
wherein the controllable valve is a fourth electromagnetic valve and the controller is electrically connected with the fourth electromagnetic valve,
wherein in a first operating mode, the controller is configured to control the fourth electromagnetic valve to open, such that the refrigerant flows from the first end of the compression assembly to one end of the outdoor heat exchanger,
wherein in a second operating mode, the controller is configured to control the fourth electromagnetic valve to open such that the refrigerant flows from one end of the outdoor heat exchanger to the first end of the compression assembly, and
wherein in a third operating mode, the controller is configured to control the fourth electromagnetic valve to close.

6. The air conditioning system according to claim 3, further comprising:
a first check valve arranged on a pipe between the third end of the compression assembly and the outlet end of the ejector, wherein a flow direction of the first check valve is from the outlet end of the ejector to the third end of the compression assembly;
a second check valve arranged on a pipe between a fourth end of the compression assembly and the another end of the outdoor heat exchanger;
a controller,
wherein a flow direction of the second check valve is from the fourth end of the compression assembly to the another end of the outdoor heat exchanger.

7. The air conditioning system according to claim 6, wherein the controllable valve is a third check valve,
wherein a flow direction of the third check valve is from the first end of the compression assembly to the one end of the outdoor heat exchanger,
wherein the air conditioning system further comprises a fourth check valve arranged on a pipe between the third port of the four-way valve and the inlet end of the separator, and
wherein a flow direction of the fourth check valve is from the third port of the four-way valve to the inlet end of the separator.

8. The air conditioning system according to claim 2, further comprising a first throttle device, wherein one end of the first throttle device is connected with the another end of the outdoor heat exchanger, and wherein another end of the first throttle device is connected with the another end of the indoor heat exchanger.

9. The air conditioning system according to claim 8, wherein,
when the air conditioning system is a home air conditioning system, the first throttle device includes a capillary tube or an electronic expansion valve, or
when the air conditioning system is a multi-line system, the first throttle device includes an electronic expansion tube.

10. The air conditioning system according to claim 8, further comprises a second throttle device, wherein,
the second throttle device is configured to control a flow rate of refrigerant in a pipe between the indoor heat exchanger and the injection inlet of the ejector.

11. The air conditioning system according to claim 2, wherein,
the first operating mode is a cooling mode,
the second operating mode is a common heating mode in which the ejector does not work, and
the third operating mode is a low-temperature heating mode in which the ejector is operational.

12. An air conditioning heat pump system using an ejector, comprising:
a compression assembly;
an outdoor heat exchanger;
a first throttle device; and
an indoor heat exchanger and an ejector,
wherein an injection inlet of the ejector is connected with another end of the indoor heat exchanger, a jet inlet of the ejector is connected with one end of the outdoor heat exchanger, an outlet end of the ejector is connected with a third end of the compression assembly, a first end of the compression assembly is connected with the one end of the outdoor heat exchanger, a second end of the compression assembly is connected with one end of the indoor heat exchanger, one end of the first throttle device is connected with another end of the outdoor heat exchanger, and another end of the first throttle device is connected with the another end of the indoor heat exchanger,
wherein the air conditioning heat pump system using an ejector further comprises:
a controllable valve for controlling the flow direction arranged on a pipe between the first end of the compression assembly and the one end of the outdoor heat exchanger;
a first electromagnetic valve arranged on a pipe between the jet inlet of the ejector and the one end of the outdoor heat exchanger, the first electromagnetic valve being a two-way valve;
a second electromagnetic valve arranged on a pipe between the another end of the first throttle device and the another end of the indoor heat exchanger;
a third electromagnetic valve arranged on a pipe between the injection inlet of the ejector and the another end of the indoor heat exchanger;
a first check valve arranged on a pipe between the third end of the compression assembly and the outlet end of the ejector; and
a second check valve arranged on a pipe between a fourth end of the compression assembly and the another end of the first throttle device, and a controller,
wherein a flow direction of the first check valve is from the outlet end of the ejector to the third end of the compression assembly,
wherein a flow direction of the second check valve is from the fourth end of the compression assembly to the another end of the first throttle device,
wherein the controllable valve is in an open state in order that a refrigerant flows from the first end of the compression assembly to the one end of the outdoor heat exchanger,
wherein the controller is configured to control opening and closing of the first electromagnetic valve, the second electromagnetic valve, and the third electromagnetic valve according to a current operating mode, and
wherein, the first throttle device includes one of an electronic expansion valve, an electronic expansion tube, or a capillary tube.

13. The air conditioning heat pump system using an ejector according to claim 12, wherein the compression assembly comprises a compressor, a separator, and a four-way valve, wherein the compressor comprises an intake port and an exhaust port, wherein the separator comprises a liquid outlet end, a gas outlet end, and an inlet end, and wherein the four-way valve comprises a first port, a second port, a third port, and a fourth port,
   wherein the first port is connected with the exhaust port of the compressor; the second port is connected with the one end of the outdoor heat exchanger,
   wherein the third port is connected with the inlet end of the separator,
   wherein the fourth port is connected with the another end of the indoor heat exchanger, and
   wherein the intake port of the compressor is connected with the gas outlet end of the separator, and the liquid outlet end of the separator is connected with the another end of the first throttle device.

14. The air conditioning heat pump system using an ejector according to claim 13, wherein when the controllable valve is a fourth electromagnetic valve, the controller is further configured to control opening and closing of the fourth electromagnetic valve according to a current operating mode.

15. The air conditioning heat pump system using an ejector according to claim 14, wherein the controller is configured to:
   in a cooling mode, control the fourth electromagnetic valve and the second electromagnetic valve to open the pipe, and control the first electromagnetic valve and the third electromagnetic valve to close the pipe;
   in a common heating mode, control the fourth electromagnetic valve and the second electromagnetic valve to open the pipe, and control the first electromagnetic valve and the third electromagnetic valve to close the pipe; and
   in a low-temperature heating mode, control the fourth electromagnetic valve and the second electromagnetic valve to close the pipe, and control the first electromagnetic valve and the third electromagnetic valve to open the pipe.

16. The air conditioning heat pump system using an ejector according to claim 13, wherein when the controllable valve is a third check valve, a flow direction of the third check valve is from the first end of the compression assembly to the one end of the outdoor heat exchanger, wherein the air conditioning heat pump system uses an ejector and further comprises a fourth check valve arranged on a pipe between the third port of the four-way valve and the inlet end of the separator, and wherein a flow direction of the fourth check valve is from the third port of the compression assembly to the inlet end of the separator,
   wherein the controller is configured to:
   in a cooling mode, control the second electromagnetic valve to open the pipe, and control the first electromagnetic valve and the third electromagnetic valve to close the pipe; and
   in a heating mode, control the first electromagnetic valve and the third electromagnetic valve to open the pipe, and control the second electromagnetic valve to close the pipe.

17. The air conditioning heat pump system using an ejector according to claim 12, wherein the air conditioning heat pump system uses an ejector and further comprises a second throttle device, wherein the second throttle device is configured to control a flow rate of refrigerant in a pipe between the indoor heat exchanger and the injection inlet of the ejector.

18. An outdoor unit of an air conditioner, comprising:
a compression assembly;
an outdoor heat exchanger;
a first throttle device; and
an ejector,
wherein an injection inlet of the ejector is configured to be connected with another end of an indoor heat exchanger,
wherein a jet inlet of the ejector is connected with one end of the outdoor heat exchanger,
wherein an outlet end of the ejector is connected with a third end of the compression assembly,
wherein a first end of the compression assembly is connected with the one end of the outdoor heat exchanger,
wherein a second end of the compression assembly is configured to be connected with one end of the indoor heat exchanger,
wherein one end of the first throttle device is connected with another end of the outdoor heat exchanger,
wherein another end of the first throttle device is configured to be connected with the another end of the indoor heat exchanger, and
wherein the air conditioning system using an ejector further comprises:
a controllable valve for controlling the flow direction arranged on a pipe between the first end of the compression assembly and the one end of the outdoor heat exchanger;
a first electromagnetic valve arranged on a pipe between the jet inlet of the ejector and the one end of the outdoor heat exchanger, the first electromagnetic valve being a two-way valve;
a second electromagnetic valve arranged on a pipe configured to be between the another end of the first throttle device and the another end of the indoor heat exchanger;
a third electromagnetic valve arranged on a pipe configured to be between the injection inlet of the ejector and the another end of the indoor heat exchanger;
a first check valve arranged on a pipe between the third end of the compression assembly and the outlet end of the ejector;
a second check valve arranged on a pipe between a fourth end of the compression assembly and the another end of the first throttle device; and
a controller,
wherein a flow direction of the first check valve is from the outlet end of the ejector to the third end of the compression assembly,
wherein a flow direction of the second check valve is from the fourth end of the compression assembly to the another end of the first throttle device,
wherein the controllable valve is in an open state in order that a refrigerant flows from the first end of the compression assembly to the one end of the outdoor heat exchanger, and
wherein the controller is configured to control opening and closing of the first electromagnetic valve, the second electromagnetic valve, and the third electromagnetic valve according to a current operating mode.

* * * * *